United States Patent [19]

Seguchi et al.

[11] Patent Number: 5,322,822
[45] Date of Patent: Jun. 21, 1994

[54] ULTRA-HIGH-STRENGTH REFRACTORY SILICON CARBIDE FIBER AND PROCESS FOR PRODUCING SAME

[75] Inventors: Tadao Seguchi; Noboru Kasai, both of Gunma; Kiyohito Okamura, Osaka; Masaki Sugimoto, Nara; Tsuyoshi Mitsuhashi, Osaka, all of Japan

[73] Assignee: Japan Atomic Energy Research Institute, Tokyo, Japan

[21] Appl. No.: 971,088

[22] Filed: Nov. 4, 1992

[51] Int. Cl.⁵ .................. C04B 35/54; C04B 35/56
[52] U.S. Cl. ................................. 501/88; 501/55; 423/345
[58] Field of Search .............. 501/87, 88; 528/14, 528/33; 525/477; 364/65, 66; 423/344, 345

[56] References Cited

U.S. PATENT DOCUMENTS

| | | | |
|---|---|---|---|
| 4,100,233 | 7/1978 | Yajima | 423/345 |
| 4,657,991 | 4/1987 | Takamizawa et al. | 525/477 |
| 4,954,596 | 9/1990 | Takeda et al. | 528/14 |
| 5,145,813 | 9/1992 | Takeda et al. | 501/97 |

FOREIGN PATENT DOCUMENTS 9252270 of 1991 Japan .
9294670 of 1991 Japan .

OTHER PUBLICATIONS

Seishi Yajima et al.; Continuous Silicon Carbinde Fiber of High Tensile Strength; Chemistry Letters, pp. 931-934, 1975.

Seishi Yajima et al.; Structural Analysis In Continuous Silicon Carbide Fiber of High Tensile Strength; Chemistry Letters, pp. 1209-1212, 1975.

S. Yajima et al.; The Development of a Silicon Carbide Fiber With High Tensile Strength-Conversion of Organic materials Into Inorganic; Nature; 261 (1976) pp. 683-685.

Seishi Yajima et al.; Synthesis of Continuous SIC Fibers with High Tensile Strength; Journal of the American Ceramic Society, vol. 59, No. 708, Jul. Aug. 1976.

*Primary Examiner*—Mark L. Bell
*Assistant Examiner*—A. Wright
*Attorney, Agent, or Firm*—Banner, Birch, McKie and Beckett

[57] ABSTRACT

Ultra-high-strength refractory silicon carbide fiber having a decomposition temperature of not less than about 1800K, a breaking strength of not less than about 5 GPa, and a modulus of elasticity of not less than about 300 GPa is disclosed, which is obtained by irradiating a precursor comprising organosilicon compound fiber with an ionizing radiation in a mixed carrier gas comprising a reactive gas and a first inert gas to render the precursor infusible and calcining the irradiated precursor in a second inert gas. Irradiation damage can be minimized, and no oxygen is incorporated into the fiber.

10 Claims, No Drawings

ULTRA-HIGH-STRENGTH REFRACTORY SILICON CARBIDE FIBER AND PROCESS FOR PRODUCING SAME

FIELD OF THE INVENTION

This invention relates to ultra-high-strength refractory silicon carbide fiber obtained from fiber spun from a precursor organosilicon compound and a process for producing same. More particularly, it relates to ultra-high-strength refractory silicon carbide fiber having a high strength of not less than about 5 GPa (500 kg/mm$^2$) and a heat decomposition temperature of not less than about 1800K which is obtained by rendering the above-mentioned precursor infusible while minimizing possible damage thereto, and to a process for producing same by ionizing irradiation.

BACKGROUND OF THE INVENTION

Silicon carbide fiber currently put into practical use includes silicon carbide fiber ("NICALON" produced by NIPPON CARBON) and titanium-containing silicon carbide fiber ("TYRANNO fiber" produced by UBE INDUSTRIES). These silicon carbide fibers are produced by rendering the precursor polycarbosilane fiber or polytitanocarbosilane fiber infusible by thermal oxidation, followed by calcination in an inert atmosphere (the treatment for rendering a precursor infusible will hereinafter be referred to as infusibilization). However, a large quantity of oxygen is introduced into the precursor during thermal oxidation for infusibilization. For example, NICALON and TYRANNO fibers have an oxygen content of about 10% by weight and about 18% by weight, respectively. Because of the high oxygen content, both and fiber undergo thermal decomposition when exposed to high temperatures exceeding about 1500K and suffer an abrupt reduction of strength. It is reported that the maximum strength of NICALON and TYRANNO fiber at temperatures below the respective thermal decomposition temperature is about 3 GPa and about 3.5 GPa, respectively.

In an attempt to improve the heat resistance of silicon carbide fiber, it has been proposed to conduct the infusibilization by means of an ionizing radiation to obtain a silicon carbide fiber having a reduced oxygen content and thereby having a thermal decomposition temperature of about 1800K or higher. The silicon carbide fiber obtained by such a process has a breaking strength of about 2.5 GPa even after heat treatment at about 1800K. It has also been proposed to conduct the ionizing irradiation for infusibilization in a reactive gas, such as acetylene, so as to reduce the requisite radiation dose. This technique is directed to increase the efficiency of radiation-induced crosslinking.

Taking advantage of infusibilization by irradiation, a process for infusibilizing silicon carbide fiber by radiation-induced oxidation to improve the strength has been developed. With this process, silicon carbide fiber having a breaking strength of about 5 GPa at the maximum can be produced. However, since the process involves introduction of oxygen into the silicon carbide fiber, the heat resistance of the resulting fiber is equal to or slightly higher than that reached by infusibilization by thermal oxidation.

SUMMARY OF THE INVENTION

It is therefore an object of the present invention to provide silicon carbide fiber having high strength and heat resistance.

The above-described conventional processes comprising infusibilization a precursor by thermal oxidation or irradiation followed by calcination is considered to inflict serious damage on the precursor. In particular, the surface of the precursor is assumed to suffer from defects or cracks upon being infusibilized.

The inventors have conducted extensive investigations for the purpose of developing an infusibilization technique which minimizes such surface defects occurring on the precursor and eliminates introduction of oxygen into the silicon carbide fiber and, as a result, having achieved the present invention.

The present invention provides ultra-high-strength refractory silicon carbide fiber having a decomposition temperature of not less than about 1800K, a breaking strength of not less than about 5 GPa, and a modulus of elasticity of not less than about 30 GPa, which is obtained by irradiating a precursor comprising organosilicon compound fiber with an ionizing radiation in a mixed carrier gas comprising a reactive gas and a first inert gas to render the precursor infusible and calcining the irradiated precursor in a second inert gas.

The present invention further provides a process for producing ultra-high-strength refractory silicon carbide fiber, which comprises irradiating a precursor comprising organosilicon compound fiber with an ionizing radiation in a mixed carrier gas comprising a reactive gas and a first inert gas to render the precursor infusible and calcining the irradiated precursor in a second inert gas.

DETAILED DESCRIPTION OF THE INVENTION

The organosilicon compound which can be used as a precursor in the present invention generally means high-molecular weight compounds having carbon-silicon bonds, such as polycarbosilane compounds (e.g., polytitanocarbosilane) or derivatives thereof and polymethylsilane compounds (e.g., polysilane). Polycarbosilane fibers are preferred. The precursor organosilicon compound may be used in the form of fiber, either short fiber such as staple fiber or long fiber such as continuous filaments.

According to the present invention, ionizing irradiation is carried out in a mixed carrier gas comprising a first inert gas stream having added thereto a reactive gas such as acetylene, whereby radiation-induced crosslinking among the polymeric chains of the precursor is accelerated and, at the same time, the reactive gas is reacted with the surface of the precursor to repair the defects or cracks caused by the irradiation. That is, the reactive gas reacts with the surface of the precursor to induce crosslinking among the polymeric chains of the precursor thereby repairing the defects or cracks. As a result, infusibilization can be achieved with a relatively low radiation dose, and the defects occurring inside and on the surface of the precursor can be minimized.

The reactive gas which can be used in the present invention is a gas capable of causing the polymeric chains on the precursor surface to crosslink. Such a reactive gas includes, for example, acetylene, ethylene, methylacetylene and butadiene, with acetylene being preferred. While the reactive gas is typically used alone, it is also possible to use two or more reactive gases in the present invention in order to enhance the crosslinking reaction.

The first inert gas which can be used in combination with the reactive gas functions to abate the heat of the precursor accompanying ionic irradiation and the reaction of the reactive gas through heat conduction and to dilute the reactive gas for preventing it from homopolymerizing and/or heterogeneous polymerizing. Examples of suitable inert gases include helium, hydrogen, argon and nitrogen, with helium being preferred.

During ionizing irradiation, a mixed carrier gas comprising the reactive gas and the first inert gas is made to flow. While the mixing ratio varies depending on the kind of reactive gas, the reactive gas is usually used in an amount of from about 1 to about 50% by volume. For example, in using an acetylene/helium mixed carrier gas, acetylene is used in an amount of from about 2 to about 15% by volume.

The ionizing radiations which can be used in the present invention include α-rays, β-rays, γ-rays, X-rays, accelerated electron rays and ultraviolet rays. For practical use, γ-rays or accelerated electron rays are advantageous. From the standpoint of efficiency of infusibilization and crosslinking, the exposed dose preferably ranges from about 10 kGy to about 10 MGy, and particularly from about 0.3 MGy to about 3 MGy.

After being infusibilized by ionizing irradiation, the precursor is subjected to calcination in a second inert gas. The second inert gas to be used includes argon, helium and nitrogen, with argon being preferred. The calcining temperature usually ranges from about 800K to about 1800K, varying depending on the kind of the precursor.

The thus obtained silicon carbide fiber has a decomposition temperature of not less than about 1800K, a breaking strength of not less than about 5 GPa and a modulus of elasticity of not less than about 300 GPa.

The present invention is now illustrated in greater detail with reference to Examples, but it should be understood that the present invention is not deemed to be limited thereto.

EXAMPLE 1

Polycarbosilane fiber (fiber diameter: 20 microns) obtained by the conventional melt spinning was put in a glass-made irradiation chamber. After evacuating the chamber, electron rays of 2 MeV were used to irradiate the polycarbosilane fiber to a dose of 2 MGy in a first sample and 4 MGy in a second sample, at a dose rate of 1 kGy/s while passing an acetylene/helium mixed carrier gas containing 12% by volume of acetylene through the chamber. Then, the irradiated polycarbosilane fiber was calcined in an argon gas at a temperature of 1400K for 1 hour to obtain silicon carbide fiber.

The resulting silicon carbide fiber was subjected to a tensile test at room temperature to measure a modulus of elasticity and a breaking strength. As a result, the silicon carbide fiber obtained by irradiation of 2 MGy had a modulus of elasticity of 300 GPa and a breaking strength of 5.6 GPa; and that obtained by irradiation of 4 MGy had a modulus of elasticity of 310 GPa and a breaking strength of 6.7 GPa. The decomposition temperature of both fibers was 1800K.

EXAMPLE 2

Silicon carbide fiber was prepared in the same manner as in Example 1, except that an acetylene/helium mixed carrier gas having an acetylene content of 6% by volume was used in the ionizing irradiation, the radiation dose was 4 MGy, and the calcination temperature was changed to 1800K.

As a result of a tensile test, the resulting silicon carbide fiber had a modulus of elasticity of 350 GPa and a breaking strength of 5.0 GPa. The fiber had a decomposition temperature of 1800K.

COMPARATIVE EXAMPLE 1

Silicon carbide fiber was prepared in the same manner as in Example 1, except that calcination was carried out in an acetylene/helium mixed gas having an acetylene content of 8% by volume at a temperature of 2000K.

As a result of a tensile test, the resulting silicon carbide fiber had a modulus of elasticity of 250 GPa and a breaking strength of 1.5 GPa.

While the invention has been described in detail and with reference to specific examples, it will be apparent to one skilled in the art that various changes and modifications can be made without departing from the spirit and scope of the present invention.

What is claimed is:

1. A silicon carbide fiber having a decomposition temperature of not less than about 1800K, a tensile strength of not less than about 5 GPa, and a modulus of elasticity of not less than about 300 GPa, which is obtained by irradiating a precursor comprising organosilicon compound fiber with an ionizing radiation in a mixed carrier gas comprising a reactive gas and a first inert gas to render the precursor infusible, wherein said ionizing radiation is irradiated at an exposed dose of from about 10 kGy to about 10 MGy, and calcining the irradiated precursor in a second inert gas.

2. The silicon carbide fiber as claimed in claim 1, wherein said organosilicon compound is a polycarbosilane compound or a polymethylsilane compound.

3. A process for producing a silicon carbide fiber, which comprises irradiating a precursor comprising organosilicon compound fiber with an ionizing radiation in a mixed carrier gas comprising a reactive gas and a first inert gas to render the precursor infusible, wherein said ionizing radiation is irradiated at an exposed dose of from about 10 kGy to about 10 MGy, and calcining the irradiated precursor in a second inert gas.

4. The process as claimed in claim 3, wherein said reactive gas is acetylene, ethylene, methylacetylene or butadiene.

5. The process as claimed in claim 3, wherein said first inert gas is helium, hydrogen, argon or nitrogen.

6. The process as claimed in claim 3, wherein said mixed carrier gas contains from about 1 to about 50% by volume of the reactive gas.

7. The process as claimed in claim 3, wherein said ionizing radiation is α-rays, β-rays, γ-rays, X-rays, accelerated electron rays, or ultraviolet rays.

8. The process as claimed in claim 3, wherein said second inert gas is argon, helium or nitrogen.

9. The process as claimed in claim 3, wherein said calcining is at a temperature of from about 800K to about 1800K.

10. A silicon carbide fiber having a decomposition temperature of not less than about 1800K, and a tensile strength of not less than about 5 GPa.

* * * * *